(12) United States Patent
Kajiwara

(10) Patent No.: US 9,052,010 B2
(45) Date of Patent: Jun. 9, 2015

(54) GEAR

(71) Applicant: Enplas Corporation, Saitama (JP)

(72) Inventor: Yasushi Kajiwara, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 14/303,675

(22) Filed: Jun. 13, 2014

(65) Prior Publication Data

US 2014/0366668 A1  Dec. 18, 2014

(30) Foreign Application Priority Data

Jun. 14, 2013 (JP) .................................. 2013-125160

(51) Int. Cl.
*F16H 55/08* (2006.01)

(52) U.S. Cl.
CPC ....... *F16H 55/0806* (2013.01); *Y10T 74/19949* (2015.01); *Y10T 74/19972* (2015.01); *F16H 55/08* (2013.01)

(58) Field of Classification Search
CPC ........... F16H 1/00; F16H 55/00; F16H 55/08; F16H 55/10; F16H 55/17
USPC .................... 74/457, 460, 462, 466, 431, 434
See application file for complete search history.

(56) References Cited

U.S. PATENT DOCUMENTS

| | | | | |
|---|---|---|---|---|
| 2,447,104 A | * | 8/1948 | Trbojevich | 74/462 |
| 3,855,874 A | * | 12/1974 | Honma et al. | 74/462 |
| 4,051,745 A | * | 10/1977 | Ishikawa | 74/462 |
| 4,754,661 A | * | 7/1988 | Barnett | 74/459.5 |
| 5,271,289 A | * | 12/1993 | Baxter, Jr. | 74/462 |
| 5,454,702 A | * | 10/1995 | Weidhass | 418/206.5 |
| 7,178,420 B2 | * | 2/2007 | Barth | 74/459.5 |
| 7,950,305 B2 | * | 5/2011 | Gutmann et al. | 74/457 |
| 8,381,608 B2 | * | 2/2013 | Okamoto | 74/462 |
| 2004/0025346 A1 | | 2/2004 | Barth | |
| 2008/0236320 A1 | * | 10/2008 | Takumori | 74/462 |
| 2009/0049942 A1 | * | 2/2009 | Miyaoku et al. | 74/462 |
| 2009/0064812 A1 | | 3/2009 | Gutmann et al. | |
| 2011/0219898 A1 | * | 9/2011 | Miura | 74/458 |

FOREIGN PATENT DOCUMENTS

| | | |
|---|---|---|
| JP | 2004-519644 | 7/2004 |
| JP | 2009-531613 | 9/2009 |

* cited by examiner

*Primary Examiner* — William Kelleher
*Assistant Examiner* — Bobby Rushing, Jr.
(74) *Attorney, Agent, or Firm* — Wenderoth, Lind & Ponack, L.L.P.

(57) ABSTRACT

A half of a tooth right-angled cross-sectional shape in a tooth bottom side area of a tooth divided at a tooth bottom center is defined by a first involute portion extending from the tooth bottom center P0 toward a tooth surface, an arcuate portion connected smoothly to the first involute portion, a second involute portion connected smoothly to the arcuate portion, a third involute portion connected smoothly to the second involute portion, and a tooth surface connecting curved portion connecting the third involute portion and the tooth surface smoothly. Radii of curvature of the arcuate portion and the first, second and third involute portions are determined so that a stress variation width in a stress state of a so-called partly reverse state caused by tensile stress and compression stress generated in the tooth bottom side area of the tooth before and after the meshing of the tooth can be uniformized.

4 Claims, 9 Drawing Sheets

(a) (b)

(a)

TOOTH BOTTOM CENTERLINE (b)

TOOTH BOTTOM CENTERLINE

GEAR

BACKGROUND OF THE INVENTION

1. Field of the Invention

The present invention relates to a gear used widely in a power transmission mechanism of automotive vehicles, precise machines, industrial machines, components thereof and the like.

2. Description of the Related Art

In the related art, various ingenuities have been attempted on gears used in the power transmission mechanism of the automotive vehicles, the precise machines, and the like for enhancing the strength of teeth.

First Example of Related Art

FIG. 15 illustrates a gear in the related art as described above. In FIG. 15, a gear 100 has teeth 101 having arch-shaped curved surfaces 102 on the tooth bottom side, which are close to each other to an extent that does not interfere with a trajectory of motion of teeth of a counterpart gear (pinion) meshing therewith, and the position of a dangerous section in the Hofer's 30 degrees tangent method is moved from P1 to P2 toward a tooth tip side, whereby the strength of the teeth is enhanced (refer to Patent Literature 1).

Second Example of Related Art

A gear configured to enhance the strength of dedendums by forming a tooth bottom side area of a tooth right angle cross section into an oval shape is known (refer to Patent Literature 2)

Patent Literature 1: Japanese Translation of PCT International Application Publication No. JP-T-2004-519644

Patent Literature 2: Japanese Translation of PCT International Application Publication No. JP-T-2009-531613

However, in the gears according to the first and second examples of the related art, a stress variation width including a tensile stress and a compression stress generated in the tooth bottom side area is not considered, and the maximum stress amplitude portion caused by the stress variation width generates at a center of the tooth bottom or in the vicinity thereof, so that the durability of the tooth cannot be enhanced sufficiently.

SUMMARY OF THE INVENTION

The present invention provides a gear having a tooth shape which improves durability of the tooth by considering a stress variation width generated in a tooth bottom side area of the tooth.

The invention relates to a gear 1 having an involute tooth surface 8 as illustrated in FIGS. 1 to 3, FIG. 5, and FIGS. 7 to 10. In the gear 1 of the invention, a tooth right-angled cross-sectional shape of a tooth bottom side area 10 of the tooth surface 8 is line symmetry with respect to a line 12 which connects a tooth bottom center P0 and a gear center 11. A half of the tooth right-angled cross-sectional shape in the tooth bottom side area 10 of the tooth 7 divided at the tooth bottom center P0 as a boundary is defined by a first involute portion 13 extending from the tooth bottom center P0 toward the tooth surface 8 side, an arcuate portion 14 connected smoothly to an end portion of the first involute portion 13, a second involute portion 15 connected smoothly to an end portion of the arcuate portion 14, a third involute portion 16 connected smoothly to an end portion of the second involute portion 15, and a tooth surface connecting curved portion 17 connecting an end portion of the third involute portion 16 and the tooth surface 8 smoothly. The first involute portion 13 is formed so as to be increased in radius of curvature with distance from the tooth bottom center P0. The arcuate portion 14 is formed into an arcuate shape so as to have the same radius of curvature as the maximum radius of curvature of the first involute portion 13. The second involute portion 15 is formed so as to have the same radius of curvature of a connecting portion with respect to the arcuate portion 14 as the radius of curvature of the arcuate portion 14, and to be increased in radius of curvature with distance from the arcuate portion 14. The third involute portion 16 is formed so as to have the same radius of curvature of a connecting portion with respect to the second involute portion 15 as the maximum radius of curvature of the second involute portion 15, and to be decreased in radius of curvature with distance from the second involute portion 15. The tooth surface connecting curved portion 17 is formed of a smooth curved line which does not cause a stress concentration in a connecting area between the third involute portion 16 and the tooth surface 8. A connecting portion between the second involute portion 15 and the third involute portion 16 is set to be positioned in the vicinity of a dangerous section position in the Hofer's 30 degrees tangent method. The radii of curvature of the first involute portion 13, the arcuate portion 14, the second involute portion 15, and the third involute portion 16 are determined so that a stress variation width in a stress state of a so-called partly reverse state caused by a tensile stress and a compression stress generated in the tooth bottom side area 10 of the tooth 7 before and after the meshing of the tooth 7 can be uniformized.

EFFECT OF THE INVENTION

The gear of the invention is capable of not only uniformizing the stress variation width in a state of a so-called partly reverse state between the tensile stress and the compression stress generated in the tooth bottom side area to prevent the generation of the maximum stress amplitude position at the center of the tooth bottom or in the vicinity thereof, but also preventing the maximum stress amplitude position from generating over the entire tooth bottom side area, so that the durability of the tooth is improved.

DETAILED DESCRIPTION OF THE INVENTION

Embodiments of the invention will be described with reference to the drawings.

Figure 1:
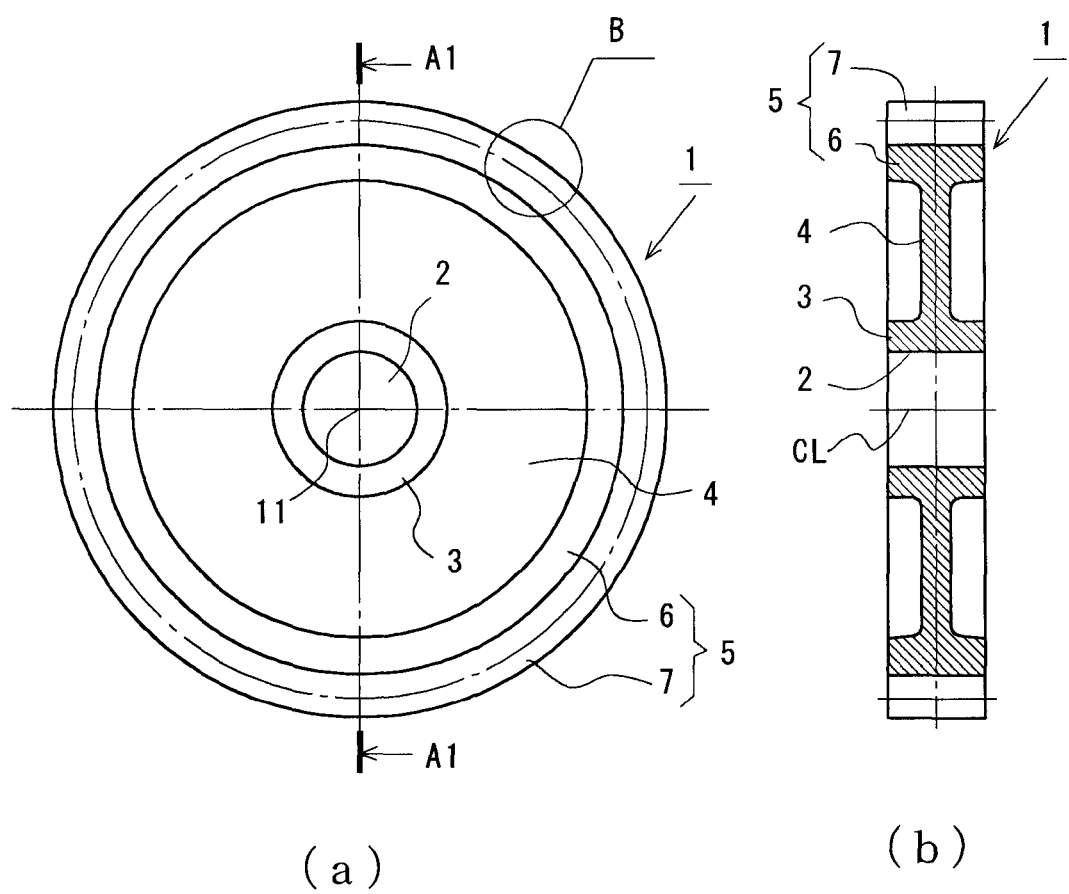
FIG. 1(a) is a front view of a gear according to an embodiment of the present invention.
FIG. 1(b) is a cross-sectional view of the gear taken along the line A1-A1 in FIG. 1(a)

FIG. 1 is a drawing illustrating a gear 1 according to the embodiment of the invention. FIG. 1(a) is a front view of the gear 1, and FIG. 1(b) is a cross-sectional view of the gear 1 taken along the line A1-A1 in FIG. 1(a).

As illustrated in FIG. 1, the gear 1 includes a boss 3 having a shaft hole 2 at a center thereof, a disc-shaped web 4 formed on an outer periphery of a center in a direction along an axial line CL of the boss 3, and a tooth portion 5 formed on an outer periphery of the web 4. The tooth portion 5 includes a plurality of teeth 7 on an outer peripheral side of a ring-shaped rim 6. The gear 1 is formed of a resin material (PA, POM, PPS, PPA, and so forth), and is manufactured by injection molding.

Figure 2:
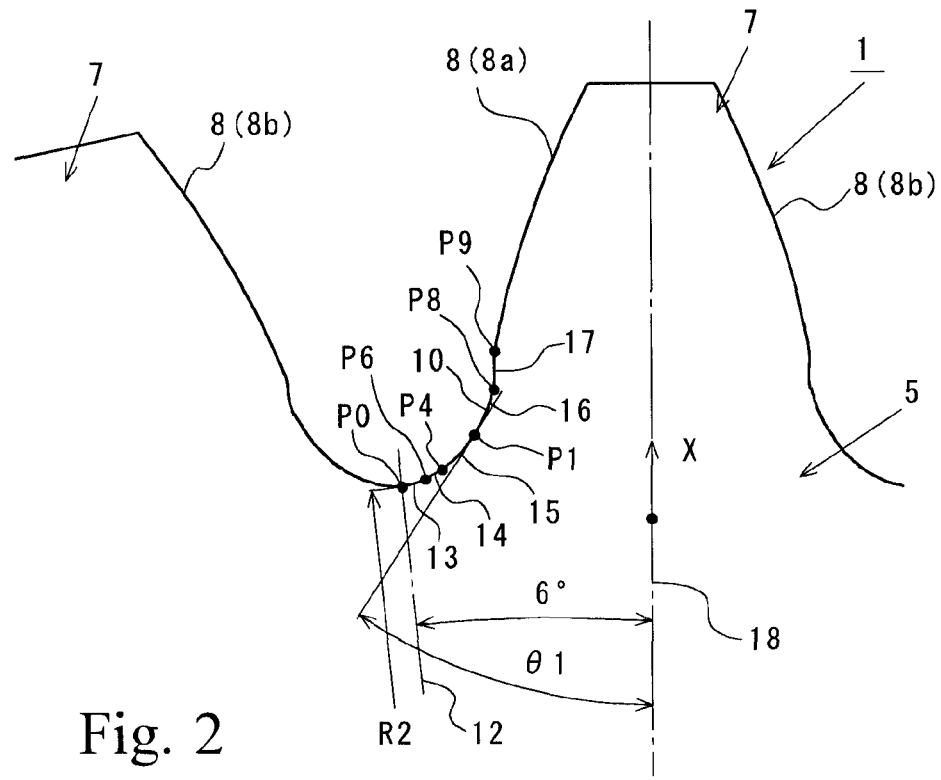
FIG. 2 is an enlarged view of a portion (the portion indicated by B) of a teeth portion of the gear illustrated in FIG. 1, and is an enlarged view of a tooth right-angled cross-sectional shape of a tooth.

FIG. 2 is an enlarged view of a portion (the portion indicated by B) of the tooth portion 5 of the gear 1 illustrated in FIG. 1, and is an enlarged view of a tooth right-angled cross-sectional shape of the tooth 7. As illustrated in FIG. 2, the tooth 7 includes an involute tooth surface 8 and a tooth bottom side area 10 smoothly connected each other. The tooth right-angled cross-sectional shape of the tooth bottom side area 10 of the tooth 7 has a line symmetry with respect to a line (tooth bottom centerline) 12 which connects a tooth bottom center P0 and a gear center 11 (see FIG. 1 and FIG. 2). A half of the tooth right-angled cross-sectional shape in the tooth bottom side area 10 of the tooth 7 divided at the tooth bottom center P0 as a boundary is defined by a first involute portion 13 extending from the tooth bottom center P0 toward the tooth surface 8 side, an arcuate portion 14 connected smoothly to an end portion of the first involute portion 13, a second involute portion 15 connected smoothly to an end portion of the arcuate portion 14, a third involute portion 16 connected smoothly to an end portion of the second involute portion 15, and a tooth surface connecting curved portion 17 connected smoothly to an end portion of the third involute portion 16 and the tooth surface 8.

Figure 3:
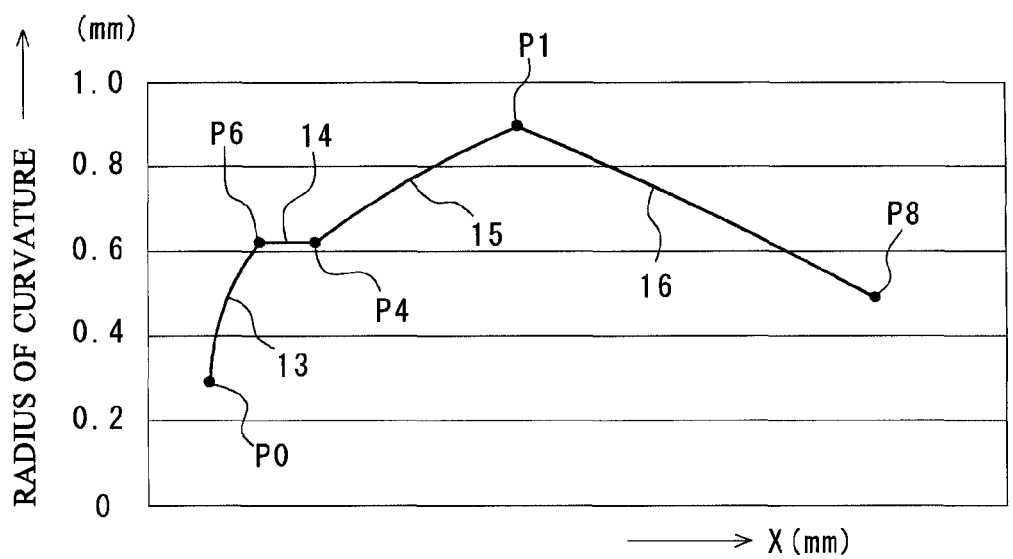
FIG. 3 is a drawing showing a radius of curvature of a first involute portion, an arcuate portion, a second involute portion, and a third involute portion according to the distance from a tooth bottom along a tooth height direction in a tooth bottom side area of the tooth illustrated in FIG. 2.

FIG. 3 is a drawing showing radii of curvature of the first involute portion 13, the arcuate portion 14, the second involute portion 15, and the third involute portion 16 according to the distance (X) from the tooth bottom center P0 along a tooth height direction. First of all, the first involute portion 13 is formed so as to be increased in radius of curvature with distance from the tooth bottom center P0. The arcuate portion 14 is formed into an arcuate shape so as to have the same radius of curvature as the maximum radius of curvature of the first involute portion 13. The second involute portion 15 has the same radius of curvature of a connecting portion (P4) with respect to the arcuate portion 14 as the radius of curvature of the arcuate portion 14, and is formed so as to be increased in the radius of curvature with distance from the arcuate portion 14. The third involute portion 16 has the same radius of curvature of a connecting portion (P1) with respect to the second involute portion 15 as the maximum radius of curvature of the second involute portion 15, and is formed so as to be decreased in the radius of curvature with distance from the second involute portion 15. The connecting portion (P1) between the second involute portion 15 and the third involute portion 16 is set to be positioned in the vicinity of the dangerous section position in the Hofer's 30 degrees tangent method. The tooth surface connecting curved portion 17 is formed of a spline curve or a Bezier curve which does not cause a stress concentration in a connecting area between the third involute portion 16 and the tooth surface 8.

Subsequently, how to determine practical shapes and the radii of curvature of the first involute portion 13, the arcuate portion 14, the second involute portion 15, and the third involute portion 16 will be described.

Figure 4:
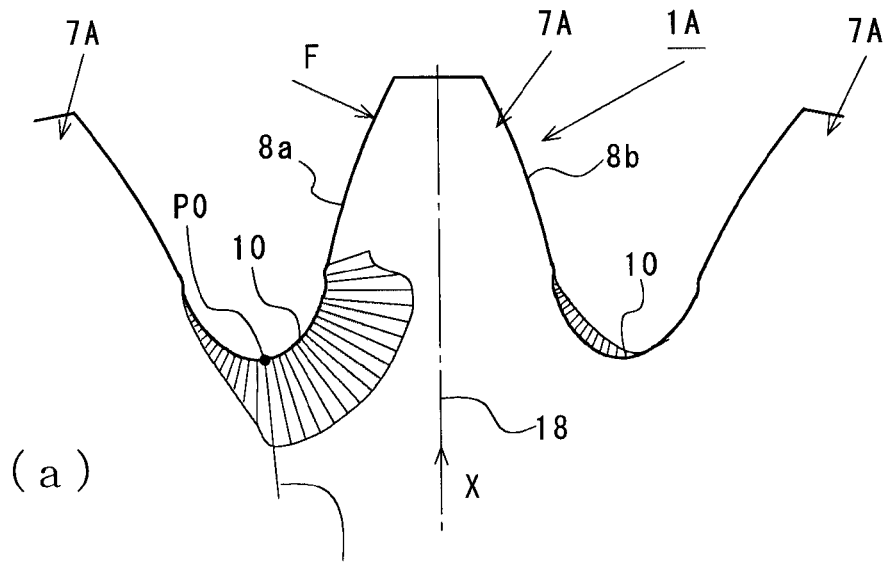
FIG. 4 is a drawing illustrating a stress distribution generating in the tooth bottom side area of an old-type tooth.
Figure 4:
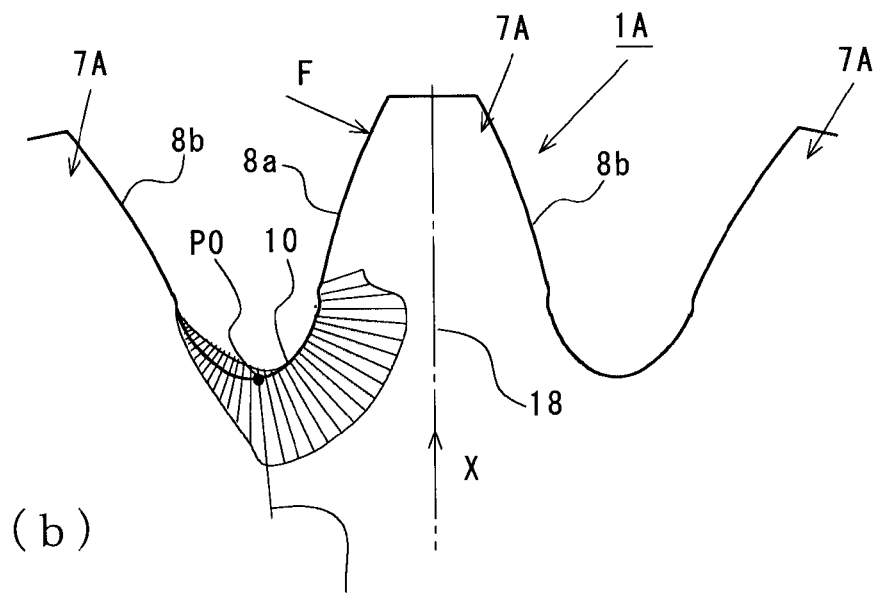

In the related art, the tooth right-angled cross-sectional shape of the tooth bottom side area of the tooth is determined by a structure analysis (for example, a structure analysis using ANSYS, which is a general purpose non-linear structure analysis software) so as to reduce the maximum value of the tensile stress and uniformize the tensile stress generated in a range from the tooth bottom center to the vicinity of the meshed tooth surface, so that statical fracture strength is improved. FIG. 4 shows a stress distribution generated in the tooth bottom side area 10 of the tooth (old type tooth) 7A of the related art. The following explanation is given on the premise that the gears 1, 1A have a module (m): 1, a pressure angle: 20 degrees, a torsion angle: 0 degree, number of teeth: 30, parallel teeth, and an involute tooth form. In FIG. 4, a length of a line drawn inward from the tooth form of the tooth bottom side area 10 represents the magnitude of the tensile stress, and a length of a line drawn outward from the tooth form of the tooth bottom side area 10 represents the magnitude of a compression stress. In FIG. 4, a point where an engaging load F is applied is a worst load point (a point where meshing is changed from two-teeth meshing to single-tooth meshing).

Figure 5:
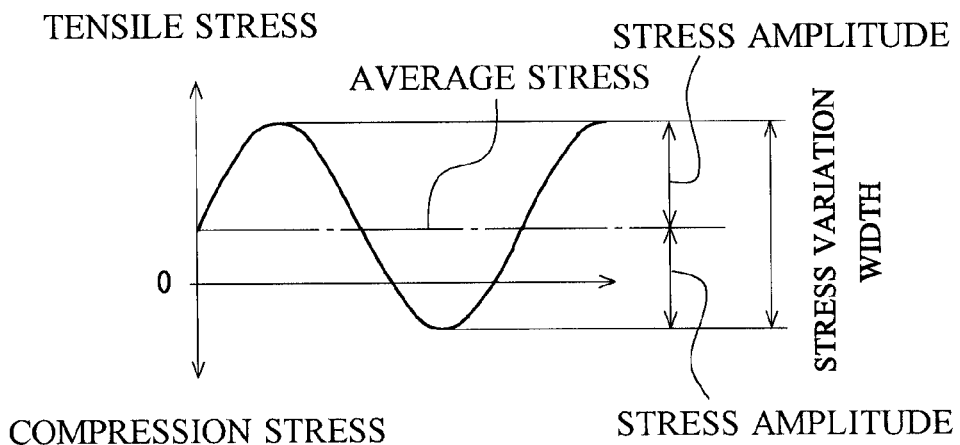
FIG. 5 is a drawing illustrating a partly reverse stress state.

As illustrated in FIG. 4(a), when it is assumed that a tooth 7A at the center meshes a tooth of the counterpart, a tensile stress is generated in the tooth bottom side area 10 on the meshed tooth surface 8a (left tooth surface in FIG. 4(a)) side of the tooth 7A. In contrast, as illustrated in FIG. 4(a), the compression stress is generated in the tooth bottom side area 10 on a non-meshed tooth surface 8*b* (right tooth surface in FIG. 4(*a*)) side of the tooth 7A. Therefore, the tooth bottom side area 10 of the meshed tooth surface 8*a* side is brought into a so-called partly reverse stress state in which the compression stress is generated after the tensile stress is generated before and after the meshing of the tooth 7A (in a case where the tooth 7A on the left side in FIG. 4(*a*) meshes a tooth of the counterpart gear after the tooth 7A at the center in FIG. 4(*a*) meshes a tooth of the counterpart gear) (see FIG. 4(*b*) and FIG. 5).

Figure 6:
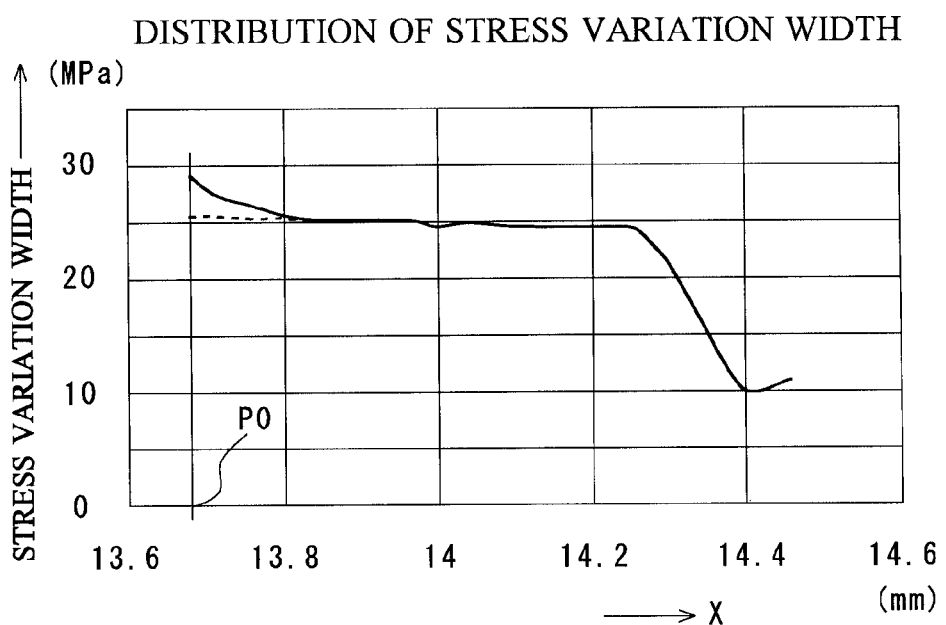
FIG. 6 is a drawing of the tooth of the old type gear illustrated in FIG. 4, and showing a relationship between a position (distance from the gear center) along a tooth thickness centerline and a stress variation width.

FIG. 6 is a drawing illustrating a relationship between a position along a tooth thickness centerline 18 (a line connecting the center of tooth thickness and the gear center 11) (the distance from the gear center 11) and the stress variation width in the tooth (old-type tooth) 7A of the related art illustrated in FIG. 4, in which a lateral axis represents a distance (X-coordinate) from the gear center 11, and a vertical axis represents the stress variation width. In FIG. 6, a solid line represents a change in the stress variation width (stress variation width distribution) including the tensile stress and the compression stress. In FIG. 6, a dot line illustrates a change in the tensile stress. As illustrated in FIG. 6, the solid line and the dot line are almost overlapped except for a range from the vicinity of the tooth bottom center to the tooth bottom center P0.

As illustrated in FIG. 6, the stress variation width is abruptly increased from the vicinity of the tooth bottom center toward the tooth bottom center P0, and the stress variation width has a peak at the tooth bottom center P0 (see FIG. 4(*b*)). In this manner, in a gear 1A having a tooth shape determined so that the tensile stress generated in a range from the tooth bottom center P0 to a point in the vicinity of the meshed tooth surface 8*a* is uniformized, generation of fatigue failure at the tooth bottom center P0 is a concern because the maximum stress amplitude is generated at the tooth bottom center P0.

Figure 7:
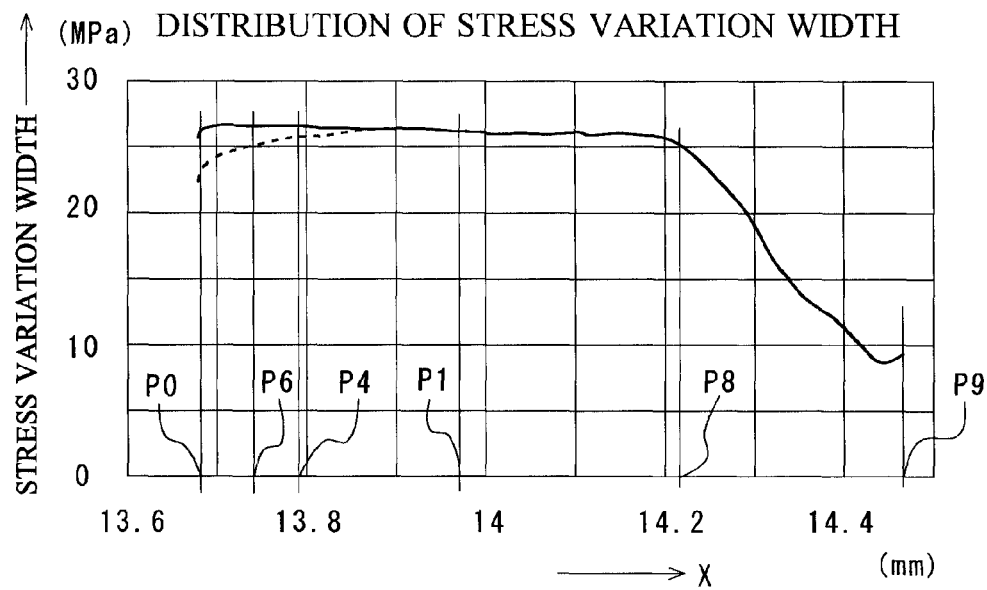
FIG. 7 is a drawing of a tooth of the gear of the invention, and showing a relationship between a position (distance from the gear center) along the tooth thickness centerline and the stress variation width.

Therefore, as illustrated in FIG. 7, in the gear 1 of the invention, the tooth right-angled cross-sectional shape of the tooth bottom side area 10 of the tooth 7 reduces the tensile stress so that the stress variation width (stress amplitude) is not increased from the vicinity of the tooth bottom center to the tooth bottom center P0, a tooth shape (the first involute portion 13, the arcuate portion 14, the second involute portion 15, and the third involute portion 16) is obtained by the structure analysis (for example, the structure analysis using the ANSYS, which is a general purpose non-linear structure analysis software) so that the stress variation width (stress amplitude) generated in a range from the tooth bottom center P0 to the point in the vicinity (P8 point) of the meshed tooth surface 8*a* is substantially uniformized, and the radii of curvature of the first involute portion 13, the arcuate portion 14, the second involute portion 15, and the third involute portion 16 are obtained (see FIGS. 2 to 3). In FIG. 7, a solid line represents a change in stress variation width (stress variation width distribution) including the tensile stress and the compression stress. In FIG. 7, a dot line illustrates a change in tensile stress. As illustrated in FIG. 7, the solid line and the dot line are almost overlapped except for a range from the vicinity of the tooth bottom center to the tooth bottom center P0.

Figure 8:
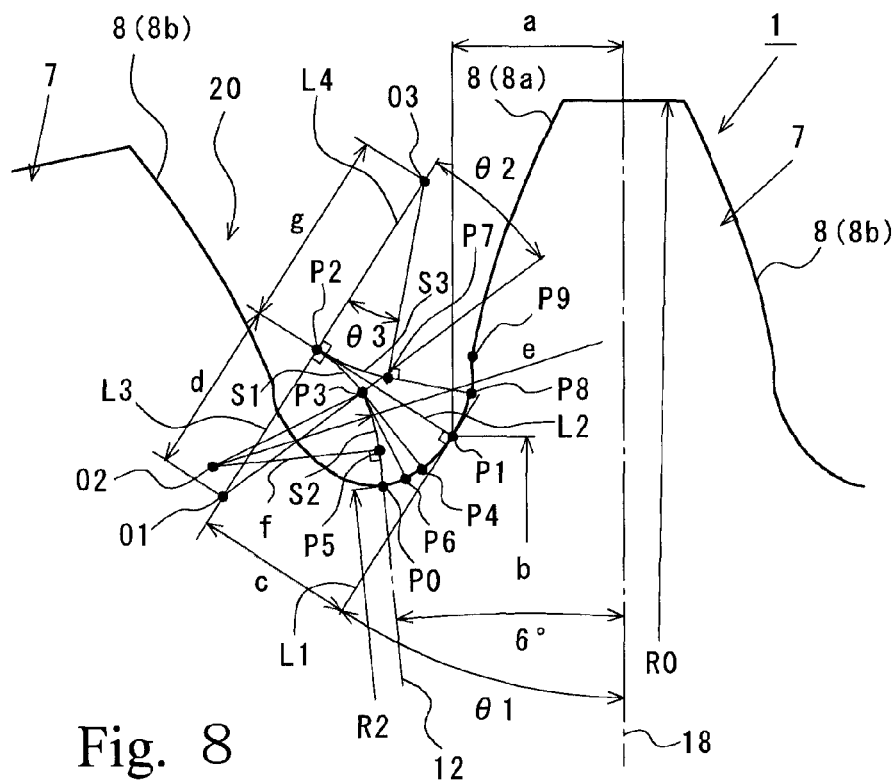
FIG. 8 is a drawing of the tooth of the gear of the invention illustrating a tooth shape in a case where the thickness of a rim is twice (2 m) a module (m) and a case where the thickness of the rim is 1.5 times (1.5 m) the module.

FIG. 8 illustrates a tooth shape in a case where the thickness of a rim 6 is twice (2 m) a module (m) and a case where the thickness of a rim 6 is 1.5 times (1.5 m) the module (see FIG. 1), and describes specifically the tooth shape (the first involute portion 13, the arcuate portion 14, the second involute portion 15, and the third involute portion 16) obtained by the structure analysis (for example, the structure analysis using the ANSYS, which is a general-purpose non-linear structure analysis software). The tooth right-angled cross-sectional shape of the tooth bottom side area 10 of the tooth 7 is a line symmetry shape with respect to a tooth bottom centerline 12, and hence a half portion from the tooth bottom centerline 12 will be described.

In the tooth shape illustrated in FIG. 8, a point where the radius of curvature changes from increasing to decreasing is defined as P1, and a tangential line L1 at the point P1 is obtained. Assuming that an angle formed between the tangential line L1 and the tooth thickness centerline 18 is defined as $\theta 1$, since the $\theta 1$ is an angle approximated to 30 degrees, the point P1 can be said to be a point in the vicinity of the dangerous section position in the Hofer's 30 degrees tangent method. Subsequently, at the point P1, a perpendicular line L2 of a length c extending to a tooth groove 20 side orthogonal to the tangential line L1 is obtained. An end point of the perpendicular line L2 is defined as P2, and a line L3 of a length d orthogonal to the perpendicular line L2 at the end point P2 and extending from the end point P2 toward the adjacent different tooth 7 (the tooth on the left side of FIG. 8) side is obtained. An end point of the line L3 is defined as O1, and a basic circle S1 having a radius d is drawn with a center at the end point O1 over an angular range of $\theta 2$. Subsequently, when a string having a length c and an end at the end point P2 is wound around the basic circle S1, the second involute portion 15 in a range from P1 to P4 is drawn by a distal end of the string having the length c (See FIG. 2). The second involute portion 15 is increased in the radius of curvature with distance from P4 toward P1.

Subsequently, an end point of the basic circle S1 is defined as P3, and an intersecting point O2 between an arc having a radius e with a center at the end point P3 and a line f having a length e and extending in a direction orthogonal to the tooth bottom centerline 12 is obtained. Then, a basic circle S2 having a center at the intersecting point O2 and a radius e is drawn from the end point P3 to an intersecting point P5 between the line f and the tooth bottom centerline 12.

Subsequently, the string having the length c and an end portion at the end point P2 is moved until it comes into touch with the basic circle S2. In this case, the string having the length c is in a state of being wound on the basic circle S1, and is turned about the end point P3 to draw an arc from P4 to P6 at a distal end thereof. The arc from P4 to P6 corresponds to the arcuate portion 14 (see FIG. 2). The radius of curvature of the arcuate portion 14 has the same dimension as the length of a line P3-P4.

Subsequently, the string having the length c and an end portion at the end point P2 is wound around the basic circle S2, and a distal end of the string having the length c with an distal end at the end point P2 is moved from P6 to the tooth bottom center P0 to draw the first involute portion 13 (see FIG. 2). The first involute portion 13 is increased in the radius of curvature with distance from the tooth bottom center P0 toward P6.

Subsequently, a line L4 orthogonal to the perpendicular line L2 at the end point P2 and having a length g extending in a direction from an end point P2 opposite to the line L3 is obtained. An end point of the line L4 is defined as O3, and a basic circle S3 having a radius g with a center at the end point O3 is drawn over an angle of $\theta 3$. Subsequently, when the string having the length c and an end portion at the end point P2 is wound around the basic circle S3, the third involute portion 16 in a range from P1 to P8 is drawn by a distal end of the string having the length c (See FIG. 2). The third involute portion 16 is decreased in the radius of curvature with distance from P1 toward P8.

Subsequently, the end point P8 of the third involute portion 16 and a tooth bottom side end point P9 of the tooth surface 8

(8a) are connected with a spline curve or a Bezier curve smoothly. A range from P8 to P9 drawn by the spline curve or the Bezier curve corresponds to the tooth surface connecting curved portion 17 (see FIG. 2).

Table 1 illustrates respective dimensions of a tooth shape in a case where the thickness of the rim 6 is twice a module (m) and a case where the thickness of the rim 6 is 1.5 times the module (m).

TABLE 1

| | gear having a rim thickness of 2.0 (m) | gear having a rim thickness of 1.5 (m) |
|---|---|---|
| A | 1.021 | 1.0166 |
| B | 13.9832 | 13.9702 |
| C | 0.9677 | 0.9018 |
| D | 1.056 | 0.8537 |
| E | 1.0096 | 0.8475 |
| G | 1.2 | 0.9 |
| R0 | 16 | 16 |
| R2 | 13.75 | 13.75 |
| θ1 | 32.40 | 33.50 |
| θ2 | 20.41 | 18.78 |
| θ3 | 22.12 | 23.21 |

Unit from a to R2 is millimeter (mm)
Unit from θ1 to θ3 is degrees (°)

Figure 9:
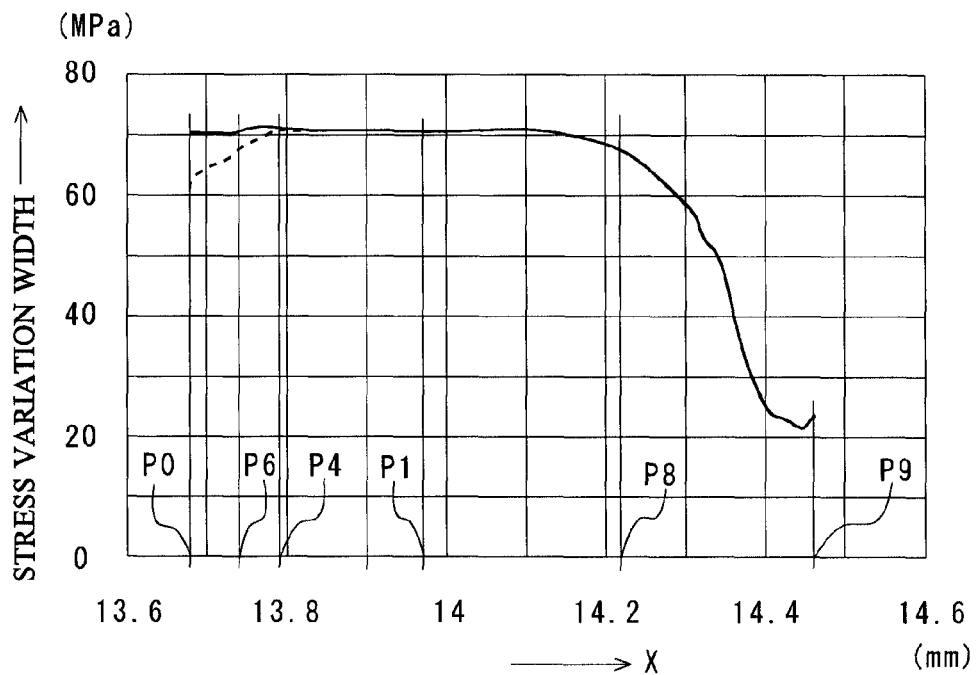
FIG. 9 is a drawing of a tooth of the gear of the invention and a tooth of a gear having a rim thickness of twice (2 m) a module (m), and showing a relationship between a position (distance from the gear center) along a tooth thickness centerline and the stress of variation width.

FIG. 9 is a drawing of the gear 1 (the invented gear 1) with the rim 6 having a thickness twice the module, and is a drawing illustrating a change of the stress variation width in a half of the tooth bottom side area 10 of the tooth 7 divided at the tooth bottom center P0 as a boundary. In FIG. 9, the lateral axis represents the distance (X-coordinate) from a gear center P0, and the vertical axis represents the stress variation width. In FIG. 9, a solid curve from the curves showing a change in the stress variation width represents a change in the stress variation width including the tensile stress and the compression stress, and a dot curve represents a change in the stress variation width focusing only on the tensile stress.

As illustrated in FIG. 9, the stress variation width shown by a solid line in an area from the vicinity of the tooth bottom center to the tooth bottom center P0 is uniformized and the stress variation width shown by a solid line in the area from the tooth bottom center P0 to the tooth surface side end point P8 of the third involute portion 16 is substantially uniformized.

Figure 10:
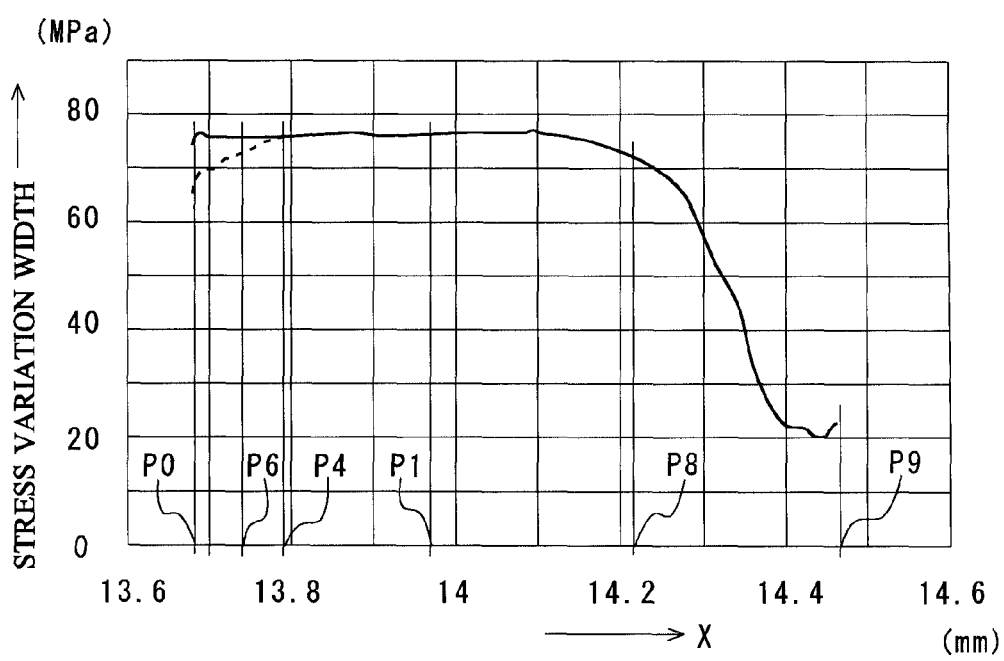
FIG. 10 is a drawing of a tooth of the gear according to the invention having a rim thickness of 1.5 times (1.5 m) the module (m), and illustrating a relationship between the position (distance from the gear center) along the tooth thickness centerline and the stress variation width.

FIG. 10 is a drawing of the gear 1 (the invented gear 2) with the rim 6 having a thickness 1.5 times the module, and is a drawing illustrating a change of the stress variation width in a half of the tooth bottom side area 10 of the tooth 7 divided at the tooth bottom center P0 as a boundary. In FIG. 10, the lateral axis represents the distance (X-coordinate) from the gear center P0, and the vertical axis represents the stress variation width. In FIG. 10, a solid curve from the curves showing a change in the stress variation width represents a change in the stress variation width including the tensile stress and the compression stress, and a dot curve represents a change in the stress variation width focusing only on the tensile stress.

As illustrated in FIG. 10, the stress variation width shown by a solid line in an area from the vicinity of the tooth bottom center to the tooth bottom center P0 is uniformized and the stress variation width shown by a solid line in the area from the tooth bottom center P0 to the tooth surface side end point P8 of the third involute portion 16 is substantially uniformized.

Comparative Examples

Figure 11:
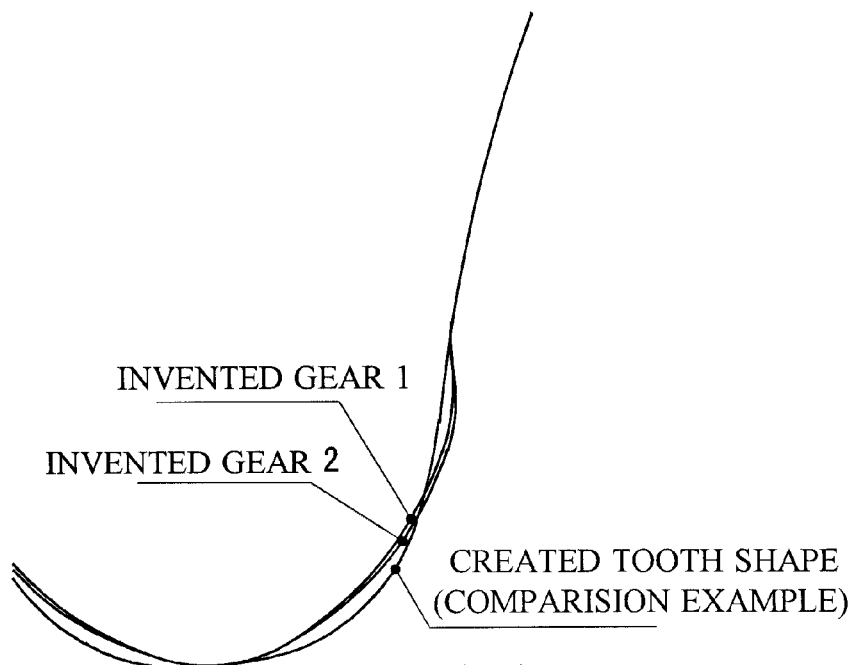
FIG. 11 is a drawing illustrating the difference in shape between the tooth bottom side area of the tooth according to a comparative example (a gear having a created tooth form) and the tooth bottom side areas of the tooth according to the invented gears 1 and 2 by overlapping each other for clarifying the difference therebetween.

FIG. 11 is a drawing illustrating the difference in shape between the comparative example (Comparative Examples 1 and 2), which is the gear having a created tooth shape with which a fillet curve of the tooth bottom is created a rack-shaped tool having a tooth tip of R 0.375 mm, and the invented gears 1 and 2 clarifying the difference therebetween by overlapping the shape of the tooth bottom side area of the tooth of the comparative example (Comparative Examples 1 and 2) with the shape of the tooth bottom side area of the tooth of the invented gears 1 and 2. The gear having a created tooth shape of comparative examples has the same gear specifications as the invented gears 1 and 2 (a module (m): 1, a pressure angle: 20 degrees, a torsion angle: 0 degree, number of teeth: 30, parallel teeth, and involute tooth form except for the tooth bottom side area). As illustrated in FIG. 11, when the tooth bottom centers of the invented gears 1 and 2 are aligned with the tooth bottom center of the comparative example, the tooth forms of the invented gears 1 and 2 are positioned on the tooth groove side of the created tooth shape in the vicinity of the tooth bottom center, and are cut into the tooth side of the created tooth shape in the vicinity of the tooth surface with respect to the created tooth shape of the comparative example. In other words, in FIG. 11, in the case of the invented gears 1 and 2, the tooth right-angled cross-sectional shape in the tooth bottom side area 10 of the tooth 7 intersects the created tooth shape of the comparative example between the tooth bottom center P0 and the tooth bottom side end point P9 of the tooth surface 8, and is divided into two parts, namely a portion in the vicinity of the tooth bottom center and a portion in the vicinity of the tooth surface with the intersecting point with the created tooth shape as a boundary (see FIG. 8).

Figure 12:
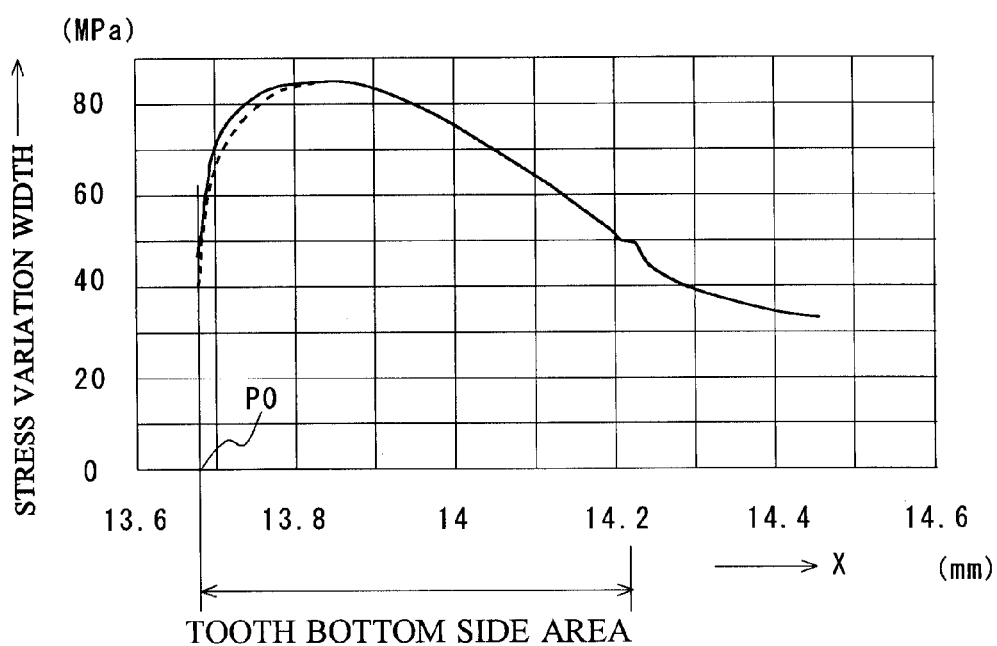
FIG. 12 is a drawing of the gear of a comparative example having a rim thickness twice the module (Comparative Example 1), and is a drawing illustrating a change of the stress variation width in a half of the tooth bottom side area of the tooth divided at the tooth bottom center as a boundary.

FIG. 12 is a drawing relating to the gear of a comparative example having a thickness of the rim 6 twice the module (Comparative Example 1), and is a drawing illustrating a change of the stress variation width in a half of the tooth bottom side area of the tooth divided at the tooth bottom center P0 as a boundary. In FIG. 12, the lateral axis represents the distance (X-coordinate) from the gear center, and the vertical axis represents the stress variation width. In FIG. 12, a solid curve from the curves showing a change in the stress variation width represents a change in the stress variation width including the tensile stress and the compression stress, and a dot curve represents a change in the stress variation width focusing only on the tensile stress.

As illustrated in FIG. 12, Comparative Example 1 in which the position where the maximum stress variation width is generated is located in the vicinity of the tooth bottom center P0, the change in stress variation width in the tooth bottom side area is large, and hence is significantly different from the invented gear 1 in which the stress variation width is uniformized from the tooth bottom center P0 in a wide range (the range from the tooth bottom center P0 to the tooth surface side end point P8 of the third involute portion 16) (See FIG. 9).

Figure 13:
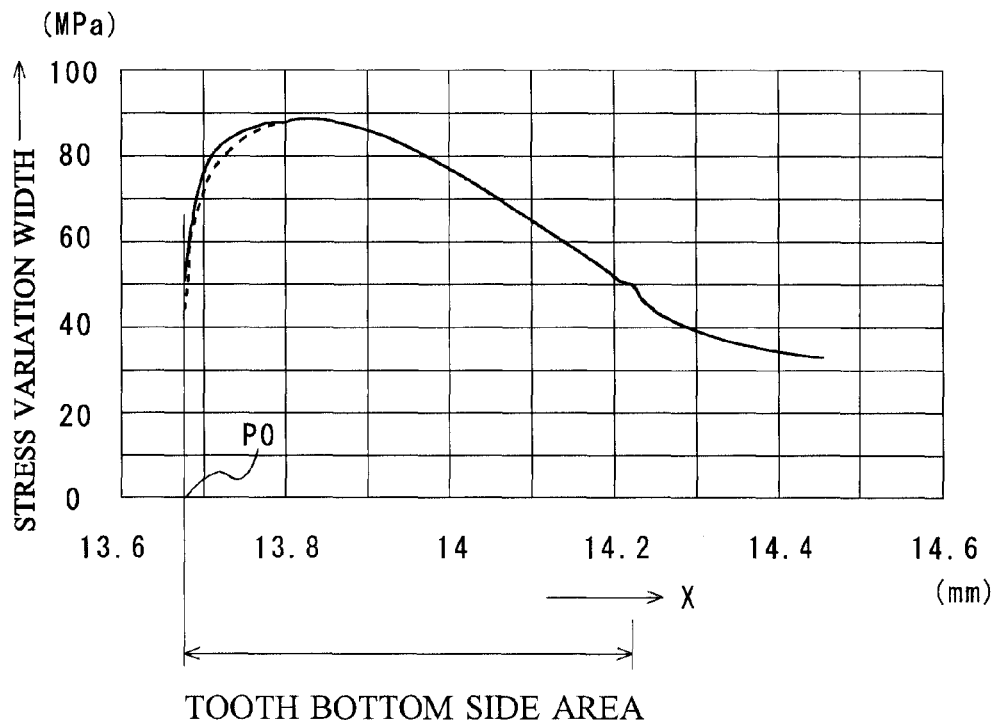
FIG. 13 is a drawing of the gear of a comparative example having a rim thickness 1.5 times the module (Comparative Example 2), and is a drawing illustrating a change of the stress variation width in a half of the tooth bottom side area of the tooth divided at the tooth bottom center as a boundary.

FIG. 13 is a drawing relating to the gear of a comparative example with the rim 6 having a thickness 1.5 times the module (Comparative Example 2), and is a drawing illustrating a change of the stress variation width in a half of the tooth bottom side area of the tooth divided at the tooth bottom center P0 as a boundary. In FIG. 13, the lateral axis represents the distance (X-coordinate) from the gear center P0, and the vertical axis represents the stress variation width. In FIG. 13, a solid curve from the curves showing a change in the stress variation width represents a change in the stress variation width including the tensile stress and the compression stress, and a dot curve represents a change in the stress variation width focusing only on the tensile stress.

As illustrated in FIG. 13, in the same manner as Comparative Example 1, Comparative Example 2 in which the position where the maximum stress variation width is generated is located in the vicinity of the tooth bottom center P0, the change in the stress variation width in the tooth bottom side area is large, and hence is significantly different from the invented gear 2 in which the stress variation width is uniformized from the tooth bottom center P0 in a wide range (the range from the tooth bottom center P0 to the tooth surface side end point P8 of the third involute portion 16) (See FIG. 10).

Comparison Between Invented Gears 1 and 2 and Comparative Examples 1 and 2

As shown in Table 2, the maximum stress variation width of the invented gear 1 can be decreased to 84.3% of the maximum stress variation width of Comparative Example 1. The maximum stress variation width of the invented gear 2 can be decreased to 87.2% of the maximum stress variation width of Comparative Example 2. In addition, the stress variation width is uniformized from the tooth bottom center P0 over a wide range in the case of the invented gears 1 and 2 (see FIG. 9 and FIG. 10). In contrast, in Comparative Examples 1 and 2, a change in the stress variation width in the tooth bottom side area corresponding to a range from P0 to P8 in the tooth bottom side area of the invented gears 1 and 2 is large (dimensional range along the X-axis direction) (see FIG. 12, FIG. 13). From these reasons, the invented gear 1 can be improved in fatigue strength in comparison with Comparative Example 1. From these reasons, the invented gear 2 can be improved in fatigue strength in comparison with Comparative Example 2.

TABLE 2

| denture model | rim thickness 2.0 | rim thickness 1.5 |
|---|---|---|
| Invention (A) | 71.6 MPa | 77.5 MPa |
| Comparative Example (B) | 84.9 MPa | 88.9 MPa |
| (A/B) | 84.3% | 87.2% |

Comparison Between Invented Gear and Old type

According to the gear (the invented gear) 1 having the tooth shape according to the invention illustrated in FIG. 2, the maximum stress variation width may be decreased by 6.4% in comparison with the gear (old type) 1A having a tooth shape in the related art illustrated in FIG. 4. When the invented gear 1 and the gear 1A of the related art are subjected to an endurance test against meshing at the same torque, respectively, the number of times of meshing that the invented gear 1 could endure was 9200000, while the number of times of meshing that the old type gear 1A could endure was 2900000. The durability of the invented gear 1 was improved three times the old type gear 1A. The invented gear 1 and the old type gear 1A have the same specifications except for the tooth shape in the tooth bottom side area, and the thickness of the rim 6 was twice the module.

First Modification

In the assumption that the gear 1 of the present invention described above is manufactured by injection molding, the thickness of the rim 6 is determined so as to fall preferably within a range from 1.5 times to three times the module and, more preferably, a range from 1.5 times to twice the module in order to ensure the strength of the tooth portion 5 and form the teeth 7 with high degree of accuracy.

Second Modification

Figure 14:
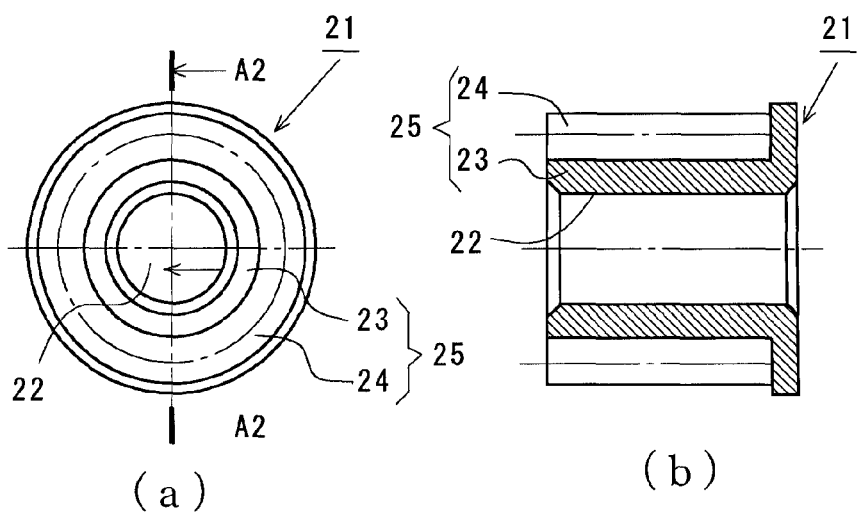
FIG. 14(a) is a front view of the gear according to a second modification of the invention.
FIG. 14(b) is a cross-sectional view of the gear taken along the line A2-A2 in FIG. 14(a)
Figure 15:
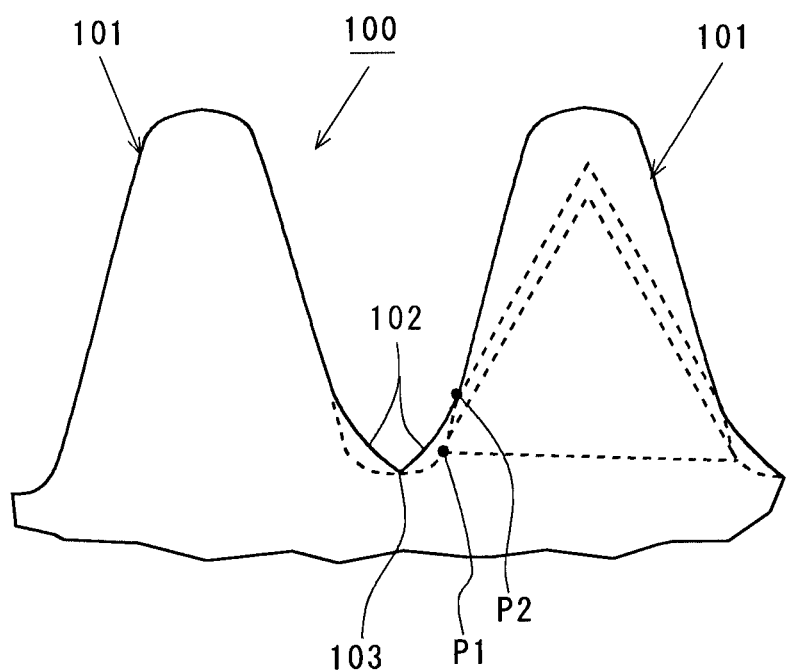
FIG. 15 is a tooth right-angled cross-sectional view of a tooth of the gear of a first example of the related art.

FIG. 14 is a drawing illustrating a gear 21 according to the second modification of the invention. FIG. 14(a) is a front view of the gear 21. FIG. 14(b) is a cross-sectional view of the gear 21 taken along the line A2-A2 in FIG. 14(a).

The gear 21 illustrated in FIG. 14 is provided with a plurality of teeth 24 on an outer periphery of a cylindrical boss (rim) 23 provided with a shaft hole 22, and the boss 23 and the tooth 24 constitute a tooth portion 25. In the gear 21 illustrated in FIG. 14, the tooth shape illustrated in FIG. 2, FIG. 8 may be applied to the tooth bottom side area of the tooth 24. In this case, the thickness of the boss 23 is determined so as to fall preferably in a range from 1.5 to 3 times the module, and more preferably in a range from 1.5 times to twice the module.

INDUSTRIAL APPLICABILITY

The tooth shape of the gear according to the invention may be applied widely to spur gears, helical gears, double helical gears, face gears, bevel gears, worm gears, Hypoid gears, and so forth.

The tooth shape of the gear according to the invention may be applied not only to resin-made gears, but also gears formed of metals (for example, alloy steel for mechanical structure, carbon steel, stainless steel, free-cutting steel, brass, phosphor bronze) and so forth.

What is claimed is:

1. A gear having an involute tooth surface, wherein:
a tooth right-angled cross-sectional shape in a tooth bottom side area of a tooth has line symmetry with respect to a line connecting a tooth bottom center and a gear center;
a half of the tooth right-angled cross-sectional shape in the tooth bottom side area of the tooth divided at the tooth bottom center as a boundary is defined by
a first involute portion extending from the tooth bottom center toward the tooth surface,
an arcuate portion connected smoothly to an end portion of the first involute portion,
a second involute portion connected smoothly and directly to an end portion of the arcuate portion,
a third involute portion connected smoothly and directly to an end portion of the second involute portion, and
a tooth surface connecting curved portion connecting an end portion of the third involute portion and the tooth surface smoothly;
the first involute portion is formed so as to be increased in radius of curvature with distance from the tooth bottom center;
the arcuate portion is formed into an arcuate shape so as to have the same radius of curvature as the maximum radius of curvature of the first involute portion;
the second involute portion is formed such that the radius of curvature of the second involute portion at a connecting portion to the arcuate portion is the same as the radius of curvature of the arcuate portion, and such that the radius of curvature of the second involute portion increases with distance from the arcuate portion;
the third involute portion is formed such that the radius of curvature of the third involute portion at a connecting portion to the second involute portion is the same as the maximum radius of curvature of the second involute portion, and such that the radius of curvature of the third involute portion decreases with distance from the second involute portion;
the tooth surface connecting curved portion is formed of a smooth curved line which does not cause a stress concentration in a connecting area between the third involute portion and the tooth surface;
the connecting portion between the second involute portion and the third involute portion is set to be positioned at a dangerous section position in a Hofer's 30 degrees tangent method; and the radii of curvature of the first involute portion, the arcuate portion, the second involute portion and the third involute portion are determined so that a stress variation width in a stress state of a partly reverse state caused by a tensile stress and a compression stress generated in the tooth bottom side area of the tooth before and after the meshing of the tooth is uniformized.

2. The gear according to claim 1, wherein the tooth surface connecting curved portion is formed of a spline curve or a Bezier curve.

3. The gear according to claim 1, wherein the tooth constitutes a tooth portion together with a rim, and a thickness of the rim is 1.5 (m) to 3.0 (m), where (m) is a module of the gear.

4. The gear according to claim 2, wherein the tooth constitutes a tooth portion together with a rim, and a thickness of the rim is 1.5 (m) to 3.0 (m), where (m) is a module of the gear.

* * * * *